United States Patent [19]
Abraham

[11] Patent Number: 6,058,072
[45] Date of Patent: May 2, 2000

[54] VELOCITY REDUCTION METHOD TO REDUCE THE FLOW-INDUCED NOISE OF TOWED SENSOR SYSTEMS

[75] Inventor: Bruce M. Abraham, Old Lyme, Conn.

[73] Assignee: The United States of America as represented by the Secretary of the Navy, Washington, D.C.

[21] Appl. No.: 09/152,470

[22] Filed: Sep. 9, 1998

[51] Int. Cl.[7] .................................................... G01V 1/38
[52] U.S. Cl. ................................. 367/20; 367/15; 181/110
[58] Field of Search ................................ 367/15, 16, 106, 367/20, 130; 181/112, 110; 114/45

[56] References Cited

U.S. PATENT DOCUMENTS 4,570,245   2/1986   Thigpen ..................................... 367/15

*Primary Examiner*—Christine K. Oda
*Assistant Examiner*—Anthony Jolly
*Attorney, Agent, or Firm*—Michael J. McGowan; Robert W. Gauthier; Prithvi C. Lall

[57] ABSTRACT

A system and method are disclosed for reducing flow-induced noise in an underwater towed system. The system includes at least one neutrally buoyant towed array, a tow platform for defining a towed direction of the at least one towed array, a neutrally buoyant tow cable connected to the at least one towed array and the tow platform, and a deploy and retrieve apparatus for deploying and retrieving the tow cable. The deploy and retrieve apparatus is connected to both the tow cable and the tow platform. Deployment of the tow cable from the deploy and retrieve apparatus correspondingly deploys the at least one towed array, and retrieval of the tow cable with the deploy and retrieve apparatus correspondingly retrieves the at least one towed array. The speed of deployment of the tow cable can be varied to decrease the velocity of the towed array relative to the surrounding water thus reducing flow-induced noise.

18 Claims, 3 Drawing Sheets

VELOCITY REDUCTION METHOD TO REDUCE THE FLOW-INDUCED NOISE OF TOWED SENSOR SYSTEMS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

This invention generally relates to a velocity reduction method for reducing the flow-induced noise of towed sensor systems. More particularly, the invention relates to a method for reducing the tow velocity of a hydrophone system while keeping the tow vessel speed constant and therefore reducing the flow-induced noise received by the hydrophones without affecting ship trajectory or operation. By reducing the flow-induced noise, higher quality data can be obtained.

(2) Description of the Prior Art

Arrays of pressure sensors are used in both commercial and military systems for the reception of sound waves in water, air, or other fluids. The array is a multi-sensor system which allows for the simultaneous acquisition of signals from spatially separated locations. Commercial towed systems use hydrophone arrays to locate oil deposits beneath the ocean floor. Military systems use pressure sensor arrays to locate and classify acoustic targets (e.g., a ship or submarine in water or a tank in air). A fundamental limitation of towed systems of pressure sensors is the flow-induced noise. This non-acoustic noise is generated by pressure fluctuations at the solid/fluid interface of the structure containing the sensors. Some part of the noise is transmitted through the structure and received by the pressure sensors. The resulting unwanted noise is termed, "self-noise" because it is the resulting noise of the system in the absence of any acoustic signals. The flow-induced noise is directly related to the speed of the array system relative to the surrounding fluid. Turbulence scaling has shown that the magnitude of the direct flow noise is proportional to the velocity cubed ($U_0^3$) when a fully developed turbulent boundary layer is present.

By reducing or eliminating the self-noise induced by the flow of fluid relative to the pressure sensors, performance of the pressure sensors (e.g., detection range or signal-to-noise ratio) can be maximized. The following patents, for example, disclose various attempts at noise control in arrays:

U.S. Pat. No. 2,729,300 to Paslay et al;
U.S. Pat. No. 3,281,767 to Cryar;
U.S. Pat. No. 3,286,225 to Huckabay et al;
U.S. Pat. No. 4,314,363 to Thigpen et al;
U.S. Pat. No. 4,566,083 to Thigpen;
U.S. Pat. No. 4,570,245 to Thigpen;
U.S. Pat. No. 4,581,723 to Savit;
U.S. Pat. No. 5,113,376 to Bjerkoy; a nd
U.S. Pat. No. 5,345,522 to Vali et al.

Specifically, Paslay et al. disclose a water borne means for making seismic surveys of underwater deposits of oil by seismic signals received by a plurality of detecting devices disposed within an elongated flexible streamer. The streamer is slightly positively buoyant when immersed in the water and is provided with a plurality of weights suspended therefrom at intervals and adapted to cause the streamer assembly to be neutrally buoyant when towed through the water at a high rate of speed by a moving vessel whereby the streamer slowly sinks through the water at the points of connection with the weights as the forward end of the streamer is momentarily brought to rest during the towing operation and the sections of the streamer intermediate the weights slowly rise within the water. An arrangement is thus provided in which only the forward end of the streamer is momentarily brought to rest, the remainder of the streamer continuing forward movement as a shot is fired and the entire length of the streamer is maintained in tension during the reception of the seismic signals whereby fortuitous noises of spurious character caused by a release of the towing strain within the streamer and extraneous noise signals from the lead-in connecting the streamer and the vessel are prevented from being picked up by the detecting devices. Accordingly, the patent to Paslay et al. describes a system in which the array is designed to stop and physically touch the ocean floor. The weighted streamer is used to sink the array when its motion is minimized, thus the array is not maintained at a constant depth.

The patent to Cryar discloses a method and apparatus for continuous marine seismic surveying, in which a seismic impulse source is transported along the surface of a marine body and produces seismic impulses at intervals, the reflections of which from the marine bottom and sub-bottom strata are detected and recorded to produce a profile of the sub-surface conditions. Accordingly, Cryar describes the simultaneous deployment and retrieval of two hydrophones or groups of hydrophones (an array) such that one is "always at a condition of minimum movement in the water." However, there is no consideration or understanding in Cryar of the effect that the negatively buoyant tow cable therein will have on the system, and two separate arrays must be used.

Huckabay et al. disclose a continuous marine seismic surveying system whose intent is to improve the signal-to-noise ratio in continuous marine seismic surveying by periodically stopping or slowing the motion of the towed detector member, so that during a portion of the survey operating cycle the hydrophone array can be dead in the water.

During this portion of the cycle, the requisite function of transducing the returned pressure waves can take place with little or no noise interference generated in the hydrophones.

The system has the capability of conducting a continuous survey of an area from a craft moving at a substantially constant speed. Although Huckabay et al. describe the basic concept of "stopping or slowing" the motion of the towed array to improve a signal-to-noise ratio, only the use of a neutrally buoyant array or "streamer" is described. Accordingly, Huckabay et al. fail to recognize or address the effect of a non-neutrally buoyant tow cable on the array shape.

Thigpen et al. disclose a marine seismic cable handler which is a hydraulically-powered yo-yo reel for handling a marine seismic cable in shallow water. At the beginning of a recording episode, a partially reeled-in seismic cable is released to drift to a standstill behind a ship. Data are recorded. The cable is then accelerated to match the ship's velocity. Following the initial acceleration, the cable is super-accelerated as it is partially reeled in. A microprocessor adjusts a dwell time between recording episodes to compensate for small variations in the ship's velocity. It is acknowledged that the patent to Thigpen et al. describes the basic concept of deploying the tow cable to decelerate the array to a standstill and mentions the need for maintaining a constant array depth; but proposes achieving these results via chains or buoys and does not describe a system using a neutrally buoyant tow cable.

Thigpen '083 discloses a seismic timing control system for optimizing the acoustic signal-to-noise ratios during a useful maximal-length recording cycle within the time frame of a minimal-length recording episode. To implement the method, during an intermittent-tow seismic operation, the noise level due to cable manipulation during an entire recording episode is monitored. A quiet-window of a desired length is established by adjusting the length of the interval during which the seismic cable is at rest. The initiation of a recording cycle is adjusted relative to the quiet window to take maximum advantage of the quiet period. Although Thigpen '083 describes the basic concept of deploying the tow cable to decelerate the array to a standstill and mentions the need for maintaining a constant array depth, these results are again obtained by provided chains or buoys to the array. Thigpen '083 does not describe a system using a neutrally buoyant tow cable.

Thigpen '245 discloses a constant tensioner for a seismic marine cable or towed seismic cable, wherein the instantaneous towing force and the instantaneous cable displacement relative to a fixed shipboard reference are continuously measured and sampled. A microprocessor associated with a servo controlled capstan device uses those measurements to pay out cable or to retrieve cable in response to an increase or decrease in the instantaneous towing force. The microprocessor also tries to minimize the average cable displacement. Accordingly, Thigpen '245 describes a system to maintain constant tow cable tension via deployment and retrieval of the tow cable. This system is only for small displacement and not the gross motions needed to effect flow-induced noise reduction.

The patent to Savit discloses a method for maintaining a substantially constant tension on a towed seismic cable, wherein the instantaneous towing force and the instantaneous cable displacement relative to a fixed shipboard reference are continuously measured and sampled. A microprocessor associated with a servo controlled capstan device uses those measurements to pay out cable or to retrieve cable in response to an increase or decrease in the instantaneous towing force. The microprocessor also tries to minimize the average cable displacement. As with Thigpen '245, Savit is primarily describing a system to maintain constant tow cable tension via deployment and retrieval of the tow cable and is thus only for small displacement.

The patent to Bjerkoy discloses a method for conducting seismic surveys in waters covered with ice. Seismic impulses are actuated under water and reflected signals are detected by a streamer cable towed behind a vessel in order to avoid the source of noise located outside of the seismic system due to the ice-breaking operation of the vessel. The vessel is stopped during active survey and the streamer cable is hauled in with a speed corresponding to the desired propulsion speed of the cable during detection. After detection, the vessel again resumes ordinary operational speed and the streamer is paid out with a speed which maintains the desired advancing speed of the system. Bjerkoy is therefore confined to the retrieval of an array when the tow vessel is not moving. This method cannot be used for a continuously moving vessel.

Vali et al. disclose a reduced noise fiber optic towed array and method of using the same wherein the fiber sensors are connected in parallel, and the optical fiber cable is paid out from the towing ship at a velocity about equal to but opposite to the velocity of the towing ship. Turbulence and acceleration noise is reduced due to the manner in which the fiber cable is paid out, and crosstalk between sensors is eliminated. Although Vali et al. describe the basic concept of paying out the tow cable to reduce the array velocity to zero, a negatively buoyant tow cable as used therein will cause the front end of the array to sink dramatically when the speed of the array is reduced to zero or near-zero.

SUMMARY OF THE INVENTION

Therefore it is an object of this invention to provide a system and apparatus for reducing flow-induced noise of towed sensor systems.

Another object of this invention is to provide a system and apparatus for reducing flow-induced noise of towed sensor systems in which a relative velocity is reduced between a towed array and the surrounding water.

Still another object of this invention is to provide a system and apparatus for reducing flow-induced noise of towed sensor systems in which a relative velocity is reduced between a towed array and the surrounding water by providing a neutrally buoyant towed sensor system.

A still further object of the invention is to provide a system and apparatus for reducing flow-induced noise of towed sensor systems in which a relative velocity is reduced between the towed array and the surrounding water by providing a neutrally buoyant tow cable.

Yet another object of this invention is to provide a system and apparatus for reducing flow-induced noise of towed sensor systems which is simple to manufacture and easy to use.

In accordance with one aspect of this invention, there is provided a system for reducing flow-induced noise in an underwater towed system. The system includes at least one neutrally buoyant towed array, a tow platform for defining a towed direction of the at least one towed array, a neutrally buoyant tow cable connected to the at least one towed array and the tow platform, and a deploy and retrieve apparatus for deploying and retrieving the tow cable. The deploy and retrieve apparatus is connected to both the tow cable and the tow platform. Deployment of the tow cable from the deploy and retrieve apparatus correspondingly deploys the at least one towed array, and retrieval of the tow cable with the deploy and retrieve apparatus correspondingly retrieves the at least one towed array.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF THE PREFERRED EMBODIMENT

In general, the present invention is directed to a system for reducing a tow velocity of a hydrophone system while keeping a tow vessel speed constant and therefore reducing flow-induced noise received by the hydrophone system without affecting either a trajectory or operation of a ship. By reducing the flow-induced noise received by the hydrophone system, higher quality data can be obtained.

Figure 1:
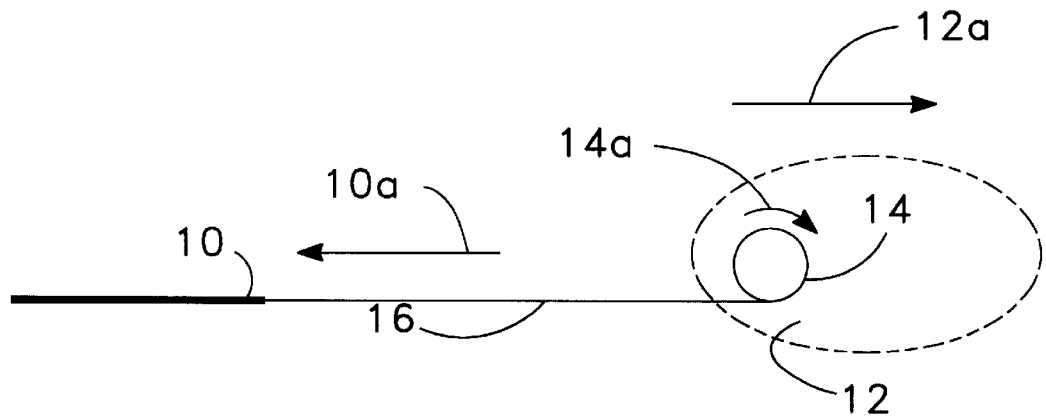
FIG. 1 is a schematic view of a proposed system according to a first preferred embodiment of the present invention.

Referring first to FIG. 1, a schematic of a first proposed system according to the present invention, the structure for achieving the system is relatively simple and includes a towed system 10 such as a hydrophone system, a tow platform 12 which determines the direction (indicated by arrow 12a) of the towed system 10, a tow cable deploy and retrieve system 14 mounted to the tow platform 12, and a tow cable 16 operatively connected to the tow cable deploy/retrieve system 14 and the towed system 10. It should be understood that generally the environment in question is an underwater environment and that the towed system 10 illustrated herein is therefore in an underwater environment and the tow platform 12 is generally situated on the surface of the water.

The towed system 10 is described herein as a hydrophone array, however, the application is suitable to any underwater towed system which is affected by flow turbulence and the noise generated therefrom. The tow platform 12 may be a barge, ship, or any other suitable surface vessel. Further, the tow cable deploy and retrieve apparatus 14 may be a pulley member or any other similar structure that is intended to reel in and reel out a length of cable 16. It will further be appreciated that the environment may be an air environment with the tow platform 12 being an airborne vehicle, or the tow platform 12 may be a submarine rather than a surface vessel.

The primary source of unwanted noise in towed hydrophone systems 10 is the noise induced by the turbulent flow of fluid (e.g., water or air) over the structure containing the hydrophones. Although not specifically shown due to the variety of options available, the hydrophone system 10 may be in a cylindrical shell, a flat plate, or other comparable housing. By reducing a relative velocity between the hydrophone system 10 and the surrounding water, a magnitude of the fluctuating noise induced by the turbulent boundary layer will be decreased. The turbulent boundary layer is defined as the layer of fluid which passes over the surface of the hydrophone system housing 10. The direct pressure flow noise scales as a function of velocity cubed, so significant reductions in flow noise are possible with modest decreases in tow speed. The method allows for the reduction in a velocity of the hydrophone array while maintaining a constant velocity of the tow platform 12 (also referred to as the tow point, e.g., a ship or tow body).

A fundamental way to decrease the flow-noise of a towed system 10 is to decrease the tow speed. Because it is not desirable to decrease the speed of the tow platform 12, the speed of the towed system 10 must be decreased independently.

This can be accomplished by increasing a deployment length of the tow cable 16 at a velocity corresponding to the desired decrease in relative velocity of the towed system 10. For example, if the tow platform 12 is traveling at a speed of 10 knots and the desired absolute speed of the towed system 10 of hydrophones is 4 knots, then the relative velocity between the tow platform 12 and the towed system 10 must be 6 knots. The tow cable 16 must then be deployed at a speed of 10.1 feet per second relative to the tow platform 12. In FIG. 1, rotation of deploy/retrieve system 14 in the direction indicated by arrow 14a, provides a relative motion of towed system 10 with aspect to tow platform 12 as indicated by 10a.

Both the tow cable 16 and the towed system 10 are formed so as to be neutrally buoyant, thereby preventing the hydrophone system 10 from sinking as the tow cable 16 is deployed. This feature of providing both a neutrally buoyant tow cable 16 and neutrally buoyant towed system has not previously been proposed in the art. Instead, it was thought that the neutrally buoyant towed system 10 and the speed at which the system was towed would compensate for non-neutrally buoyant tow cables.

Further, any electrical connections to the hydrophone system 10 may be maintained via a slip-ring conductor (not shown) within the deploy/retrieve system 14. The data connection could also be maintained through a slip-ring or with a wireless short-range transmit/receive unit (not shown).

In FIG. 1, the towed system 10 is deployed from the tow platform 12 until the available tow cable 16 length is reached. Then, the array 10 is retrieved so that another deployment cycle may begin. It should be understood that multiple systems may be implemented so that one system is always being deployed.

Figure 2:
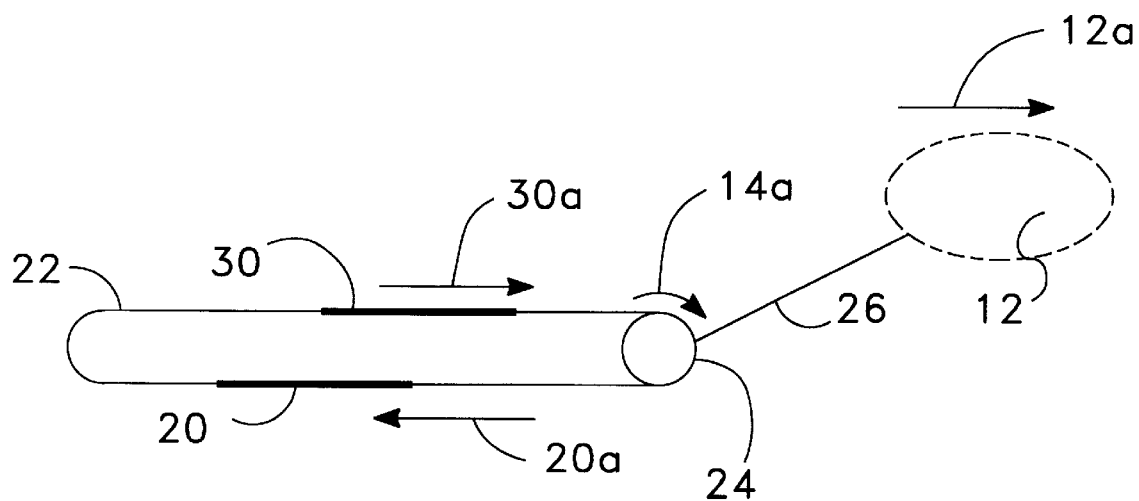
FIG. 2 is a schematic view of a proposed system according to a second preferred embodiment of the present invention.

FIG. 2 illustrates another possible system where there are actually two hydrophone systems 20, 30 connected in a looped and neutrally buoyant tow cable 22. More specifically, the tow cable 22 is looped around a remote tow cable deploy/retrieve structure 24 and the tow cable 22 is a continuous loop. The reeling structure 24 is intentionally provided to be remote from the tow platform 12, the reeling structure 24 having the tow cable 22 looped therearound. With the reeling structure 24 being positioned remote from the tow platform 12, a separate attachment line 26 is provided between the tow platform 12 and the reeling structure 24. Although not specifically shown, it is also contemplated that the reeling structure 24 may be mounted to the tow platform 12 as in the embodiment of FIG. 1. If the reeling structure 24 is in fact remote from the tow platform 12, the reeling structure 24 will be underwater during operation. While one system 20 is being deployed to reduce the absolute speed of deployment (indicated by arrow 20a) of that system and thus the self-noise, the other system 30 is being retrieved as indicated by arrow 30a. All remaining structure is similar to that shown in FIG. 1 and will not be repeated herein for the sake of brevity.

Turbulence research has shown that the pressure flow noise on the outside of a towed structure, such as a flat plate or a cylinder in axial flow, scales with the "free stream velocity" raised to the third power. In this case, the "free stream velocity" is the speed of the towed system 10 relative to the surrounding fluid. A typical scaling of the wall pressure frequency spectrum is $$\Phi(\omega) = F\left(\frac{\omega \delta^*}{U_o}\right) \rho^2 \delta^* U_o^3 \tag{1}$$

where F is a universal function of the non-dimensional frequency $\omega\delta^*/U_0$. Here $\phi(\omega)$ is the frequency power spectrum of the pressure fluctuation of the outside of the structure containing the hydrophones, $\rho$ is the surrounding fluid density, $\delta^*$ is the boundary layer displacement thickness, and $U_0$ is the free stream velocity. The function F is relatively constant at low values of non-dimensional frequency (e.g. $\omega\delta^*/U_0<0.1$). Therefore, the reduction in wall pressure power spectrum can be estimated with a reduction in free stream velocity by using equation (1) and holding F constant. For example, the ratio of the power spectra from speed 1 and 2 are, $$\frac{\Phi_2(\omega)}{\Phi_1(\omega)} = \frac{\left[F\left(\frac{\omega\delta^*}{U_o}\right)\rho^2\delta U_o^3\right]_{speed\ 2}}{\left[F\left(\frac{\omega\delta^*}{U_o}\right)\rho^2\delta U_o^3\right]_{speed\ 1}} \approx \frac{U_o^3|_{speed\ 2}}{U_o^3|_{speed\ 1}} = \left(\frac{U_2}{U_1}\right)^3 \quad (2)$$

where the right part of the equation (2) holds if the boundary layer displacement thickness and the function F do not change significantly. The power spectrum change, R, in decibels (dB) is then approximated as, $$R \approx 10\log_{10}\left[\left(\frac{U_2}{U_1}\right)^3\right] = 30\log_{10}\left(\frac{U_2}{U_1}\right). \quad (3)$$

Figure 3:
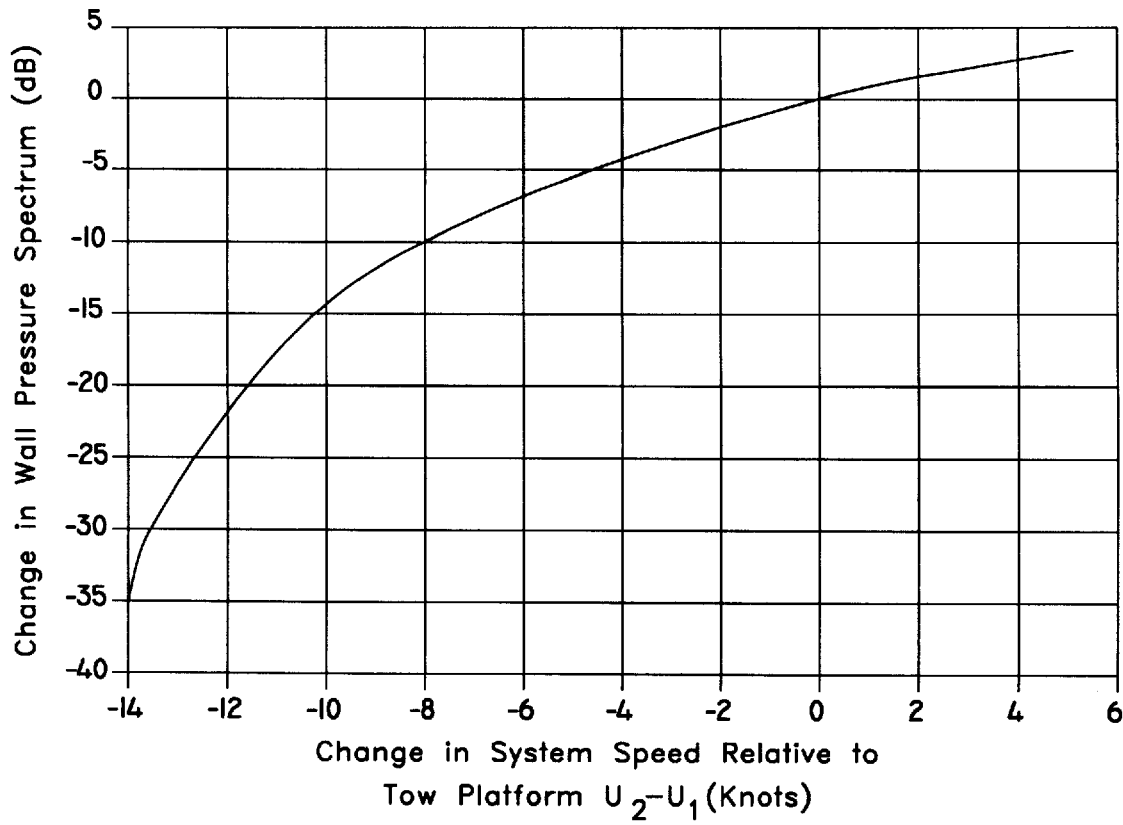
FIG. 3 is a graph illustrating an estimated change in wall pressure spectral level with a change in tow speed according to the present invention.

For a tow platform speed, $U_1$ of 15 knots, the change in wall pressure power spectrum (from the turbulent boundary layer) is shown in FIG. 3 as a function of the difference in speed between the towed system 10 and the tow platform 12, $U_2-U_1$. Negative decibel values indicate a reduction while positive values indicate an increase in power spectrum level. For example, a spectral noise reduction on the order of 14 dB is possible if the towed system velocity is decreased by 10 knots from 15 knots to an absolute speed of 5 knots. The relative velocity between the towed system 10 and the tow platform 12 dictates that the tow cable 16 length must dynamically change as a function of time. For a steady state situation, the required deployment rate of the tow cable 16 is equal to the same relative velocity of the towed system 10.

Figure 4:
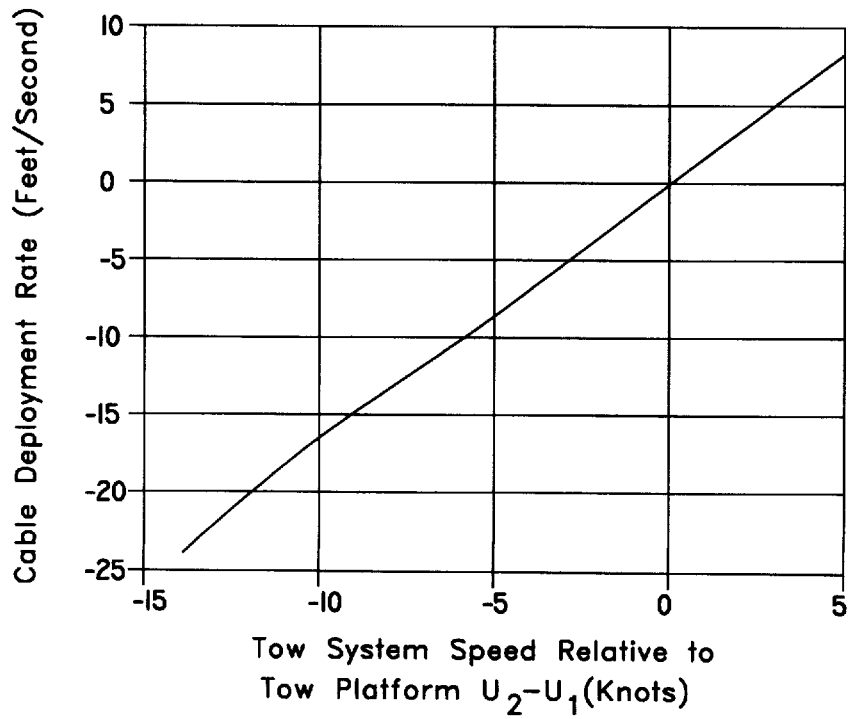
FIG. 4 is a graph illustrating a tow cable deployment rate according to the present invention.

FIG. 4 shows the cable deployment rate as a function of relative velocity. The available tow cable 16 length will dictate the time available for data acquisition unless a circular system, such as that shown in FIG. 2, is used.

Figure 5:
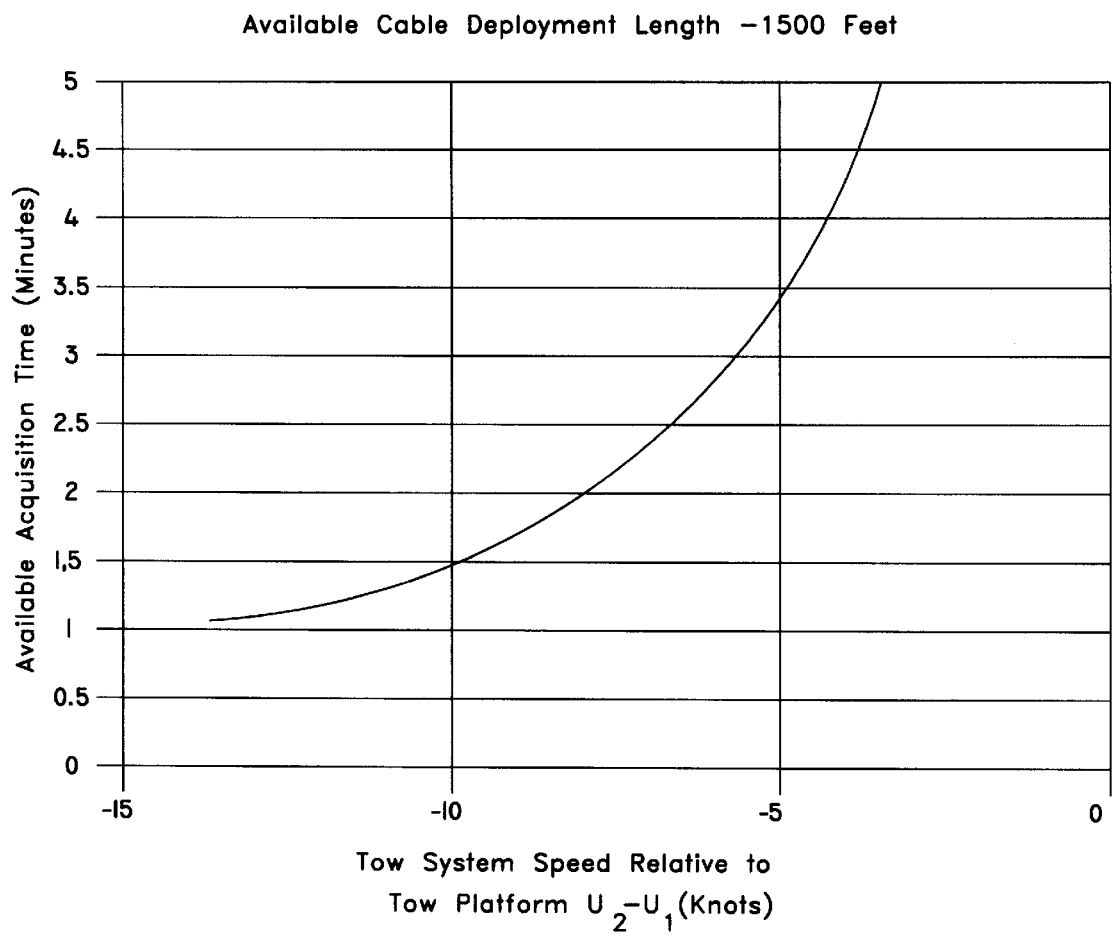
FIG. 5 is a graph illustrating data acquisition time as a function of relative tow speed.

FIG. 5 shows the available data acquisition time for an available tow cable 16 length of 1500 feet. For example, if the towed system 10 speed is decreased by 5 knots, 3 minutes of time are available for data acquisition.

The primary advantage of the proposed systems is the reduction of flow-induced noise in a towed system via a reduction in the velocity of the towed system 10, 20, or 30 independent of the speed of the tow platform 12. These noise reductions maximize the system performance by eliminating or significantly reducing the flow-induced noise for a particular acoustic environment. This type of feature for a towed system is not known to currently exist. Even if the flow-induced noise is eliminated, any system will still be limited to some extent by other factors such as ambient and electronic noise.

By the present invention, a system is achieved in which flow-induced noise from a towed array is substantially eliminated in a more efficient manner than previously achieved in the art.

This invention has been disclosed in terms of certain embodiments. It will be apparent that many modifications can be made to the disclosed apparatus without departing from the invention. Therefore, it is the intent of the appended claims to cover all such variations and modifications as come within the true spirit and scope of this invention.

What is claimed is:

1. A system for reducing flow-induced noise in a towed system comprising:
    at least one neutrally buoyant towed array;
    a tow platform for defining a towed direction of said at least one towed array;
    a neutrally buoyant tow cable connected to said at least one towed array and said tow platform; and
    a deploy and retrieve apparatus for deploying and retrieving said tow cable, said deploy and retrieve apparatus being connected to both said tow cable and said tow platform, deployment of said tow cable from said deploy and retrieve apparatus correspondingly deploying said at least one towed array, and retrieval of said tow cable to said deploy and retrieve apparatus correspondingly retrieving said at least one towed array.

2. The system according to claim 1 wherein said tow cable is deployed from said deploy and retrieve apparatus at a velocity corresponding to a desired increase in relative velocity of said at least one towed array and said tow platform.

3. The system according to claim 1 wherein said at least one towed array is maintained at a constant depth independently of a speed of said tow platform.

4. The system according to claim 1 wherein a combination of said neutrally buoyant tow cable and said at least one neutrally buoyant towed array prevent said at least one towed array from sinking upon deployment of said tow cable from said deploy and retrieve apparatus.

5. The system according to claim 1 wherein said tow cable deploy and retrieve apparatus is mounted on said tow platform.

6. The system according to claim 1 wherein said tow cable includes a first end connected to said tow cable deploy and retrieve apparatus and a second end connected to said at least one towed array.

7. The system according to claim 6 wherein a single towed array is connected to the second end of said tow cable.

8. The system according to claim 1 further comprising an intermediate tow line having a first end connected to said tow platform and a second end connected to said deploy and retrieve apparatus.

9. A system for reducing flow-induced noise in a towed system comprising:
    at least one towed array formed as a continuous loop;
    a tow platform for defining a towed direction of said at least one towed array;
    a tow cable connected to said at least one towed array and said tow platform; and
    a deploy and retrieve apparatus for deploying and retrieving said at least one towed array in a continuous loop theraround, said deploy and retrieve apparatus being connected to both said tow cable and said at least one towed array with deployment of said tow cable from said tow platform correspondingly deploying said deploy and retrieve apparatus and said at least one towed array, and
    retrieval of said tow cable to said tow platform correspondingly retrieving said deploy and retrieve apparatus and said at least one towed array.

10. The system according to claim 9 wherein said at least one towed array includes two towed arrays equally spaced apart on said continuous loop tow cable.

11. The system according to claim 10 wherein said two towed arrays are spaced apart on said continuous tow loop to provide a continuous deploy and retrieve cycle.

12. The system according to claim 9 wherein said tow cable is deployed from said deploy and retrieve apparatus at a velocity corresponding to a desired increase in relative velocity of said at least one towed array and said tow platform.

13. A method for reducing flow-induced noise in a towed system comprising the steps of:
- providing at least one neutrally buoyant towed array;
- providing a tow platform for defining a towed direction of said at least one towed array;
- connecting a neutrally buoyant tow cable to said at least one towed array and said tow platform;
- connecting a deploy and retrieve apparatus to both said tow cable and said tow platform for deploying and retrieving said tow cable;
- selectively deploying said tow cable from said deploy and retrieve apparatus thereby deploying said at least one towed array; and
- selectively retrieving said tow cable with said deploy and retrieve apparatus thereby retrieving said at least one towed array.

14. The method according to claim 13 wherein said tow cable is deployed from said deploy and retrieve apparatus at a velocity corresponding to a desired increase in relative velocity of said at least one towed array and said tow platform.

15. The method according to claim 13 wherein said deploying step further comprises maintaining said at least one towed array at a constant depth independently of a speed of said tow platform.

16. The method according to claim 13 wherein said apparatus connecting step further comprises connecting an intermediate tow line between said tow platform and said deploy and retrieve apparatus.

17. The method according to claim 13 further comprising the steps of:
- connecting said tow cable and towed array in a continuous loop; and
- looping said continuous loop around said deploy and retrieve apparatus.

18. The method according to claim 17 wherein said towed array providing step further comprises providing two towed arrays equally spaced apart on said continuous loop, the two towed arrays spaced apart on said continuous loop to provide a continuous deploy and retrieve cycle.

* * * * *